United States Patent [19]
Leach, Jr. et al.

[11] 4,144,979
[45] Mar. 20, 1979

[54] BEAVER TAIL PLATFORM ATTACHMENT FOR A TRAILER

[75] Inventors: Clayton R. Leach, Jr., Fairmont; Terry L. Munich, Sherburn, both of Minn.

[73] Assignee: Fairmont Steel Products, Inc., Fairmont, Minn.

[21] Appl. No.: 826,752

[22] Filed: Aug. 22, 1977

[51] Int. Cl.² ............................................. B65G 67/02
[52] U.S. Cl. ...................................... 414/537; 14/71.1
[58] Field of Search .................... 214/85, 85.1, 38 R, 214/38 D; 296/61; 14/69.5, 71.1, 71.3, 71.5, 71.7

[56] References Cited
U.S. PATENT DOCUMENTS

| 2,437,479 | 3/1948 | Price | 214/85 |
| 2,705,081 | 3/1955 | Jacobs | 214/85 |
| 4,020,957 | 5/1977 | Wren | 214/85 X |

*Primary Examiner*—Albert J. Makay
*Attorney, Agent, or Firm*—Williamson, Bains, Moore & Hansen

[57] ABSTRACT

A generally rectangular shaped beaver tail platform is supported in inclined relation from the rear end portion of a trailer. Locking elements on the beaver tail platform and trailer releasably lock the beaver tail platform on the trailer. Ramp members are pivotally mounted on the rear end portion of the beaver tail platform.

4 Claims, 5 Drawing Figures

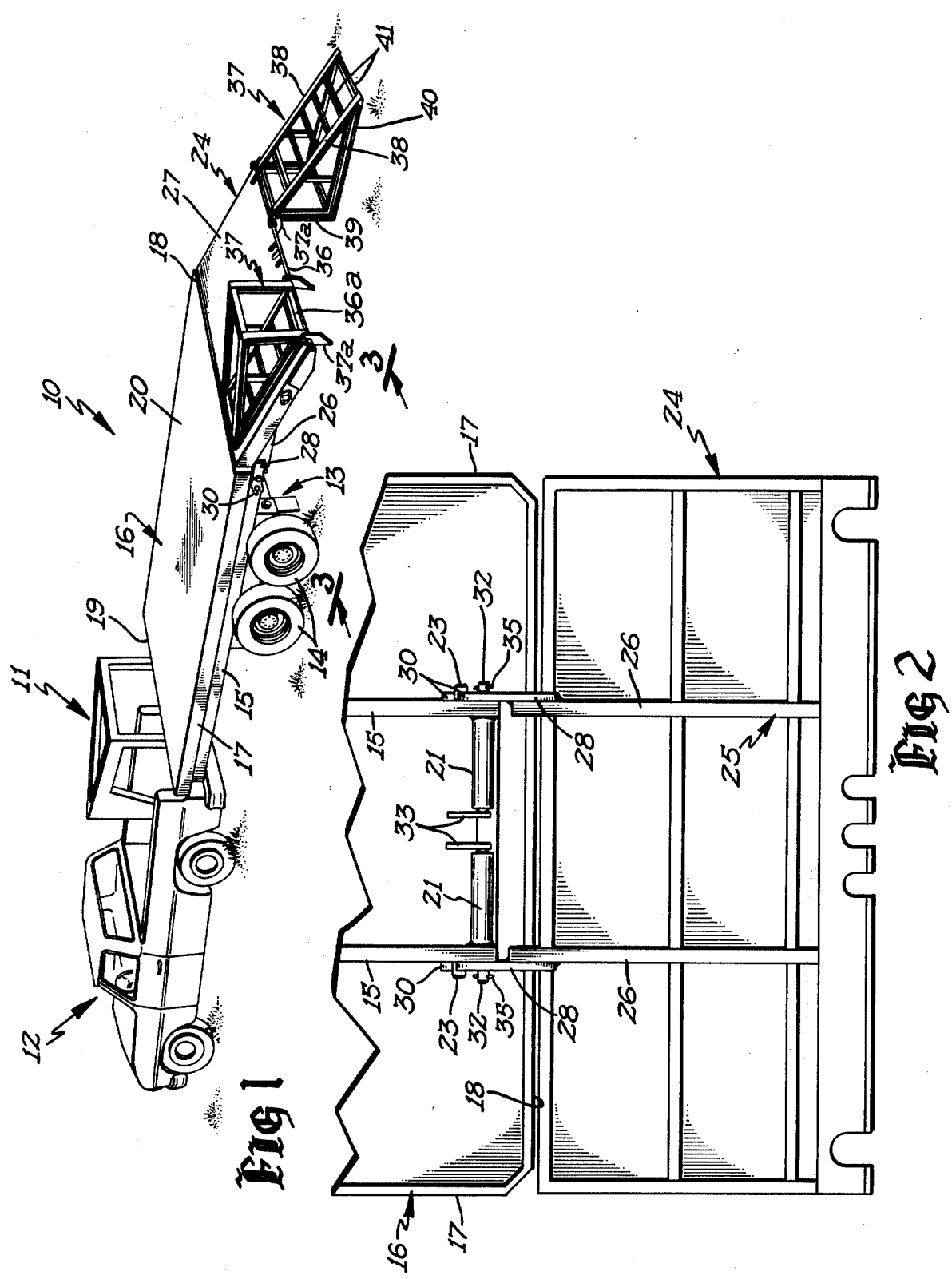

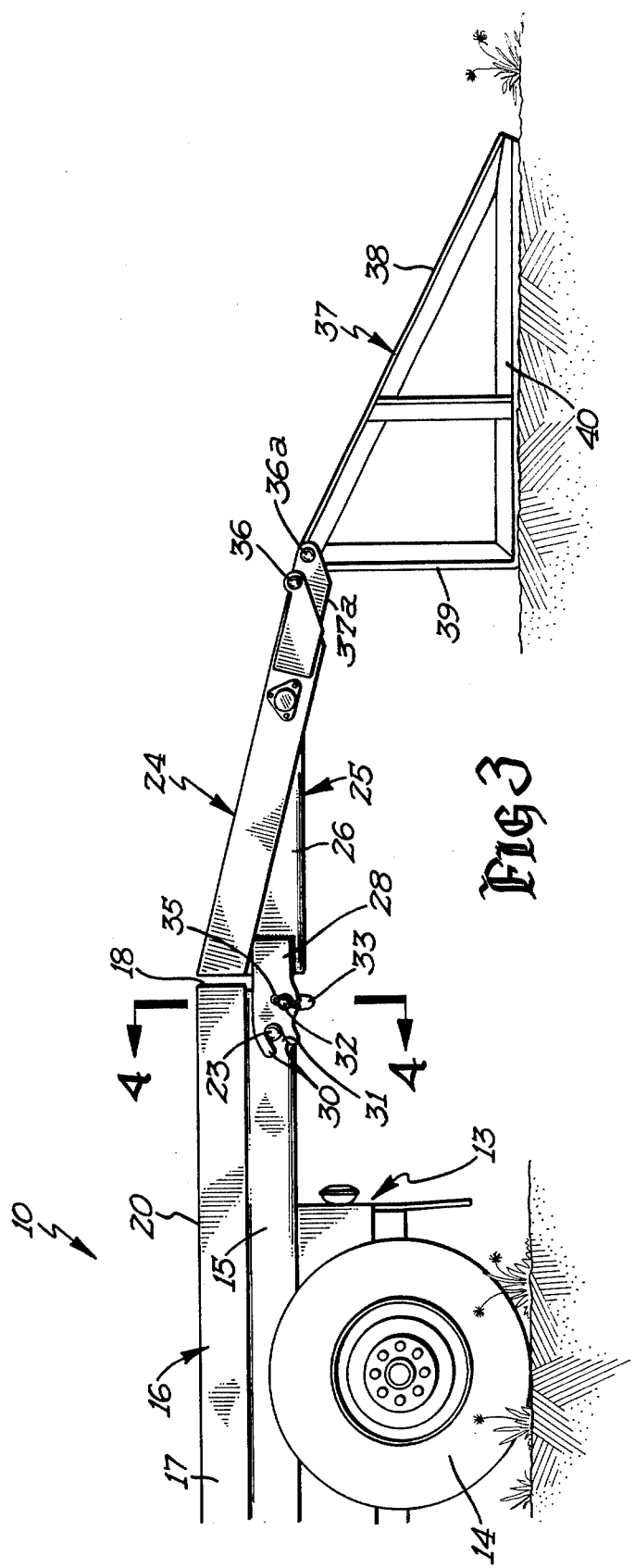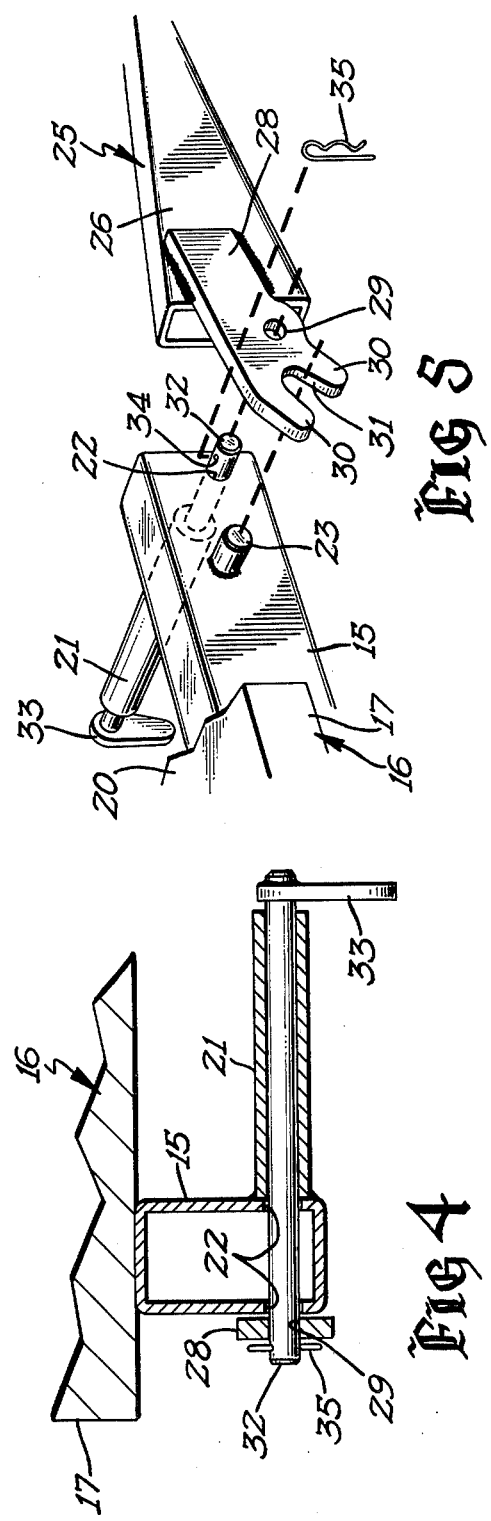

BEAVER TAIL PLATFORM ATTACHMENT FOR A TRAILER

SUMMARY OF THE INVENTION

This invention relates to trailers and more particularly to a beaver tail platform which may be readily attached and removed from a trailer or truck body.

In many farm operations, it is often necessary for farmers to transport equipment from one location to another. Transport trailers are used to transport equipment and these trailers usually include a flat bed, an inclined platform known as a beaver tail, and a ramp attached to the beaver tail platform. Many farmers own livestock trailers, grain trailers, trucks and similar transport equipment for transporting livestock, grain and the like. However, trailers used to transport equipment ordinarily cannot be used to transport livestock, grain or similar material.

It is therefore an object of this invention to provide a beaver tail platform which may be readily attached to a livestock or grain trailer bed or truck bed to convert the latter into an equipment transport vehicle.

More specifically, it is an object of this invention to provide a beaver tail platform having a ramp pivotally mounted thereon, and having lock and support elements thereon which engage lock and support elements on the trailer frame to releasably lock and support the beaver tail platform in inclined relation from the rear end portion of the trailer.

These and other objects and advantages of this invention will more fully appear from the foregoing description made in connection with the accompanying drawings, wherein like reference characters refer to the same or similar parts throughout the several views.

FIGURES OF THE DRAWINGS

FIG. 1 is a perspective view of a trailer having my novel beaver tail platform attached thereto, FIG. 2 is a fragmentary bottom plan view of the beaver tail platform illustrated in attached relation to a trailer, FIG. 3 is an elevational view taken approximately along line 3—3 of FIG. 2 and looking in the direction of the arrows, FIG. 4 is a cross-sectional view taken approximately along line 4—4 of FIG. 3 and looking in the direction of the arrows, and FIG. 5 is a fragmentary, exploded perspective view illustrating cooperating support and locking means on the beaver tail platform and trailer frame.

DESCRIPTION OF THE PREFERRED EMBODIMENT

Referring now to the drawings and more specifically to FIG. 1, it will be seen that a trailer, designated generally by the reference numeral 10, having a goose-neck hitch 11, is illustrated attached to a conventional pick-up truck 12. The trailer 10 may be the bed of a conventional livestock trailer or grain trailer in which the sides have been removed. The trailer 10 includes a chassis 13 having ground engaging wheels 14 supporting the trailer for travel. The trailer also includes a pair of laterally spaced apart, longitudinally extending, elongate frame members or stringers 15 mounted on the chassis 13 and supporting a substantially flat, horizontal bed 16. It will be noted that the bed 16 is of generally rectangular shaped configuration and includes longitudinal edges 17, a rear edge 18 and a front edge 19. The upper surface 20 of the bed 16 is generally maintained in the horizontal level condition.

Referring now to FIGS. 2, 4 and 5, it will be seen that a pair of elongate substantially straight cylindrical support tubes 21 are each welded to the rear end portion of each stringer 15 and project laterally inwardly from the inner surface thereof. In this respect, it will be noted that the support tubes 21 are disposed in coaxial relation with respect to each other. Each support tube is also disposed in registering relation with respect to an opening 22 in the associated stringer 15. A pair of generally cylindrical elongate support elements 23 are each welded to the outer surface of a stringer 15 just forwardly of the opening 22 and project laterally outwardly from the stringer as best seen in FIG. 5.

A generally rectangular shaped beaver tail platform 24 is provided and includes a frame 25 including longitudinal frame members 26 and transverse members 26a as best seen in FIG. 2. A bed or deck 27 is rigidly secured to the frame 25 and presents a substantially flat upper surface. The beaver tail platform 24 is provided with a pair of substantially identical, elongate, laterally spaced apart, support members 28 secured thereto and projecting forwardly therefrom. Each support member 28 is provided with an opening 29 therethrough intermediate the ends thereof. Each support member 28 also includes a pair of vertically spaced apart support elements 30 which are integrally formed therewith and which project forwardly and downwardly therefrom. The support elements 30 define a forwardly opening inclined slot 31 therebetween.

Referring now to FIG. 3, it will be seen that the support members 28 are each adapted to engage one of the support elements 23 on the trailer 10 whereby the support member 23 is positioned within the slot 31 and between the support elements 30. The opening 29 in each support member will then be positioned in registering relation with the opening 22 in the adjacent stringer 15.

Means are provided for releasably locking the beaver tail platform 24 on the trailer 10 and this means includes a pair of elongate engerally cylindrical locking pins or rods 32 each projecting into and being supported by one of the support tubes 21. Each locking pin 32 projects through the opening 29 in one of the support members 28 and each has an opening 34 extending substantially diametrically through the outer end portion thereof for receiving a retaining cotter pin 35 therethrough. Each locking pin is also provided with a handle 33 which is affixed to its inner end and which projects downwardly therefrom. When the locking pins releasably lock the support members 28 to the stringers 15, the beaver tail platform will be releasably locked to the trailer with its upper surface disposed in inclined relation with respect to the upper surface 20 of the trailer bed 16. The principle load and support of the beaver tail platform 24 will be borne primarily by the lower support element 30 of each support member 28.

Referring now to FIG. 1, it will be seen that the beaver tail platform 24 is provided with an elongate substantially straight cross axle 36 adjacent its rear edge and swingably accommodating a pair of laterally spaced apart ramp members 37 thereon. Each ramp member 37 is of generally triangular shaped configuration, and each includes a pair of laterally spaced apart, elongate, inclined ramp elements 38. Each inclined ramp element 38 is rigidly affixed to one of a pair of vertical ramp elements 39. Each of the vertical ramp elements is rigidly affixed at its lower end to one of a pair of longitudinal ramp elements 40, the latter also being rigidly secured to the lower ends of the inclined ramp elements 38. A plurality of transverse ramp elements 41 rigidly interconnect the inclined, vertical and longitudinal elements of each ramp member 37. Each ramp member 37 is provided with apertured ears 37a at its upper forward end which are journaled on the cross axle 36 which is journaled to the beaver tail, and also to axles 36a which are journaled directly to the individual ramps 37.

Each of the ramp members 37 is swingable between an upper inoperative position and a lower operative position, as best seen in FIG. 1. In this respect, when the ramp members 37 are in the upper inoperative position, each will be positioned in supported relation upon the beaver tail platform 24. Conversely, when each ramp member is in the lowered position, each ramp member will be positioned from the surface of the ground and will define a continuous inclined surface with the beaver tail platform to permit a vehicle to be driven upon the trailer 10.

When the trailer 10 is to be used for purposes other than transporting equipment, the beaver tail platform may be readily disconnected from the trailer by simply removing the retaining pins 35 from each locking pin and thereafter removing the locking pins from the openings 29 in the support members 28. The beaver tail platform may then be moved from supported relation with respect to the trailer 10. Alternatively, the beaver tail platform may be readily attached to the trailer by engaging the support elements on each support member with the support members on the stringers and thereafter shifting the locking pins 32 through the openings 29 in each support member. With this arrangement, a conventional trailer may be converted into a flat bed equipment hauling trailer and will obviate the need of the farmer to purchase a conventional flat bed trailer. The beaver tail platform may also be used with trucks having a flat bed to which the beaver tail platform may be connected.

Thus, it will be seen that I have provided a novel beaver tail platform trailer attachment which is not only of simple and inexpensive construction, but one which functions in a more efficient manner than any heretofore comparable arrangement.

What is claimed is:

1. A vehicle including a chassis having ground engaging wheels, a pair of laterally spaced apart elongate longitudinally extending frame members mounted on said chassis, a substantially flat bed mounted on said frame members, a pair of support elements each being mounted on one of said frame members adjacent the rear end thereof and projecting laterally outwardly therefrom, a substantially flat generally rectangular shaped beaver tail platform having front and rear ends, a pair of laterally spaced apart support members mounted on the beaver tail platform on opposite sides of the latter and projecting forwardly therefrom, each of said support members having a forwardly opening slot therein, each of said support elements engaging in the slot of one of said support members whereby the beaver tail platform is supported in inclined relation from the bed of the vehicle, each of said support members having an opening therein rearwardly of the associated slot, a pair of elongate locking rods each being mounted on one of said frame members adjacent the rear end thereof and extending transversely of said frame members, said locking rods being longitudinally slidable in a transverse direction between locked and released positions, said locking rods extending into the openings in said support members when in the locked position to releasably lock the beaver tail platform in inclined relation on the vehicle, and an inclined ramp means swingably mounted on the beaver tail platform between a lower operative position engaging the ground and an upper inoperative position on the beaver tail platform.

2. The vehicle as defined in claim 1 wherein said support elements each comprises an elongate pin rigidly affixed to the associated frame member and projecting laterally outwardly therefrom, each of said support elements being disposed forwardly of and substantially parallel to said locking rods.

3. The vehicle as defined in claim 1 wherein said slot in each of said support members opens forwardly and downwardly.

4. The vehicle as defined in claim 1 and a pair of elongate sleeves each being rigidly affixed to one of said frame members and extending laterally inwardly therefrom, each of said sleeve supporting one of said locking rods therein for sliding movement relative thereto between said released and locked positions.

* * * * *